(12) United States Patent
Joab (10) Patent No.: US 7,914,064 B2
(45) Date of Patent: Mar. 29, 2011

(54) RETRACTABLE ROOF SYSTEM FOR VEHICLES

(76) Inventor: Jacob J. Joab, La Mesa, CA (US)

( * ) Notice: Subject to any disclaimer, the term of this patent is extended or adjusted under 35 U.S.C. 154(b) by 0 days.

(21) Appl. No.: 12/419,718

(22) Filed: Apr. 7, 2009

(65) Prior Publication Data
US 2009/0273209 A1 Nov. 5, 2009

Related U.S. Application Data (63) Continuation-in-part of application No. 12/111,966, filed on Apr. 30, 2008, now abandoned.

(51) Int. Cl.
B60P 7/02 (2006.01)
(52) U.S. Cl. .................. 296/100.03; 296/99.1
(58) Field of Classification Search ............... 296/99.1, 296/216.04, 216.05, 220.01, 100.03
See application file for complete search history.

(56) References Cited

U.S. PATENT DOCUMENTS

| | | | | |
|---|---|---|---|---|
| 1,944,439 | A * | 1/1934 | Larsen | 296/37.6 |
| 5,031,949 | A * | 7/1991 | Sorimachi et al. | 296/76 |
| 6,641,201 | B1 * | 11/2003 | Pietryga et al. | 296/100.1 |

FOREIGN PATENT DOCUMENTS

| | | | | |
|---|---|---|---|---|
| FR | 1155399 | * | 11/1957 | 296/99.1 |
| GB | 2188595 | * | 10/1987 | 296/216.04 |

* cited by examiner

*Primary Examiner* — Dennis H Pedder
(74) *Attorney, Agent, or Firm* — Richard D. Clarke (57) ABSTRACT

The present invention is directed to a retractable roof system that provides slidable roof sections for vehicles and truck bed shells/caps, where the cargo area roof panels and rear window panel (hatch above tailgate) may be moved forward and above the seating area roof section, by means of a telescoping track system. Additionally, as applied to vehicles, the roof section above the seating areas may be moved rearward and above the cargo area roof section. The retractable roof system truck bed shell/cap assembly will come in segments that can be stored and shipped in a relatively small container. The shell/cap structure is composed of metal frame members and window panels. Right and left telescoping track assemblies are mounted on the metal frame members, with roof panels secured between them. Side and front window panels are attached to the exterior of the metal frame members to form the shell/cap walls. The rear window panel is attached to the rear roof panel by the means of a hinge and will pivot up onto the rear roof panel before the roof panels are moved forward and above the truck cab. An optional lumber/sport rack set may be mounted to the top of the left and right track assemblies.

20 Claims, 8 Drawing Sheets

RETRACTABLE ROOF SYSTEM FOR VEHICLES

This patent application claims the benefit of, and is a continuation-in-part (CIP) of U.S. patent application Ser. No. 12/111,966 filed on Apr. 30, 2008.

FIELD OF THE INVENTION

This application relates to the general field of vehicle manufacturing and after-market parts. As applied to vehicles, the retractable roof system allows roof sections (described herein as roof panels) to be slidably retracted, to expose either the cargo bay, or the seating area. The vehicle design variation applies to sport utility vehicles (SUVs), vans, sport/station wagons, sedans, busses and boats, including commercial, military, recreational and rescue applications. The retractable roof system will allow the translation of a plurality of roof panels in both (fore and aft) directions, to allow passengers the option of stowing seating area roof panels atop the cargo area roof panels, and additionally, the option of stowing the cargo area roof panels (and hingeably attached rear window panel) atop the seating area roof panels, within the same track system. The retractable roof system for vehicles improves upon the current practice of uncovering off-road vehicles, to offer the open outdoor experience, without the need to detach and store roof panels in a garage, especially convenient when weather turns for the worse. The retractable roof system for vehicles design would likely be integrated into the vehicle structure at vehicle manufacturing facility. The manufacturer may offer the design as an optional upgrade to an open top vehicle, such as the Jeep Liberty, in place of the currently marketed (accordion-like retractable canvas roof) Sky Slider™® option. The Retractable Roof System for vehicles allows for the open, outdoor experience such vehicles already offer, but without the need to stow large roof panels in the vehicle's cargo area, or the garage. Furthermore, the design accomplishes such versatility without substituting solid, securable materials with fabric.

The retractable roof system, as applied to a truck shell/truck cap/camper (herein referred to as a truck shell, or shell) variation also includes multiple sliding roof panels. The rear window panel is rotated approximately 270° to rest upon, and latch atop the top surface of the rear roof panel. The rear roof panel, with rear window panel-in-tote, is then cast atop the forward roof panel. All panels are then cast forward again, stowing above the truck's cab roof, by means of a telescoping system. The retractable roof system truck shell will come in different styles, for full size, mid-size and compact trucks. The system is intended for use in conjunction with (light, medium and heavy duty) four-door cabs (herein referred to as a quad cab), two-door standard cabs, commercial and military trucks. The shell design allows for easy assembly with simple hand tools and quick-connect assemblies, and would likely be manufactured as an aftermarket kit.

BACKGROUND OF THE INVENTION

Traditional truck shells are known in the art to mount atop the cargo box of a truck, to shelter and secure items in the cargo area. These shells, however, limit the capacity to transport items taller than the shell's roofline. A typical shell must be entirely removed from the cargo bed rails in order to haul such loads. Shell removal, and subsequent reinstallation, requires shoulder-press style lifting, known to be a particularly in-ergonomic method of lifting. Furthermore, the absence of hand-holds exposes the handler to pinch and laceration injury. Lastly, if a strong second person is not available to assist in the removal, and subsequent reinstallation of the shell, the process of removal and installation by a single person is inarguably dangerous to a sole person removing or installing the shell. The painted surfaces of both the truck and the truck shell may also be compromised during transition. Standard shells are designed to be neither portable nor easily stowable. Beyond the practical reasons already discussed, the inherent bulk of a standard truck shell limits the inventory of the typical shell to oversized racks, as seen in commercial yards or warehouses. Automotive supply stores, membership club stores, and mega-mart outlets lack the floor space to stock a comprehensive array of brand-specific models, of various sizes and styles of a conventional truck shell. The (unassembled) retractable roof system truck shell design lends itself to compact, palletized, corrugated cardboard/crate packaging, commonly observed in such superstores, such as Pep Boys, Costco, Home Depot and Walmart.

Numerous innovations for the truck shell have been provided in the prior art that are described as follows. Even though these innovations may be suitable for specific individual purposes to which they address, they differ from the present design as hereinafter contrasted. The following is a summary of those prior art patents most relevant to this application, and serves as a description outlining the difference between the features of the retractable roof system, truck shell variation, and the prior art.

Early on, Brooks Stevens, an industrial designer employed at the automobile manufacturer Studebaker, designed the Studebaker Wagonaire, which debuted in January of 1963, and continued production until 1966. The Wagonaire design simply allowed the roof panel above the cargo area to slide into the forward portion of the roof, not unlike a car window retracts into a car door, transposed to the horizontal position. This design differs distinctly from that of the retractable roof system, vehicle variation. It does not raise roof sections, nor does it store them above other roof sections. It does not employ a hinged rear window panel, and does not allow the roof above the seating area to open. The same design was employed in the GM Envoy XUV SUV model marketed from 2003 to 2005.

U.S. Pat. No. 7,114,769 of Robert G. Storc, James E. Robertson, and Arthur E. Macnee III describes two flexible roof sections (front and rear) that is transferrable to form a barrier between the cargo area and seating area of a van or SUV styled vehicle, by means of a pair of tracks and at least one actuator. The design of this transferrable roof section resembles that of a sectional garage door, not like the stackable, stowable design proposed with the retractable roof system, vehicle variation.

U.S. Pat. No. 4,496,184 of David A. Byrd et al. describes a portable truck cap comprising a plurality of frame members, which are detachably connected to each other to form a frame, the frame has a top portion and a base portion, the top portion is resilient, the base portion is detachably connectable to a truck. A flexible cover is disposed over the frame, and detachably connected to said base portion of the frame. The cover is tensioned by the top portion of the frame to maintain the cover in a predetermined configuration.

This patent describes a portable truck cap or shell for pick-up trucks where portions are detachably connected to the truck but it does not provide the unique sliding capability of the roof panels to be stored over the truck cab. It does not offer the heavy duty structural framework and unique support members to handle the weight of an additional lumber/sport rack, as provided by the retractable roof system, truck shell variation.

U.S. Pat. No. 4,828,315 of Scott A. W. Muirhead describes a pick-up truck cargo canopy assembly, which is enclosed and provides complete protection from weather, theft and vandalism in the cargo area. The cargo canopy assembly is divided into two separate sections. The front canopy section, which is mounted permanently to the truck bed sidewalls with a front wall having an opening behind the pick-up truck cab window and functional windows on each side. The rear canopy section, which is unitarily manufactured, is attached to the front section and the truck bed sidewalls by clamps that may be detached by removing a pin holding the two parts of the clamp together. This provides a removable rear section that may be stored when an open truck bed is desired. A hinged rear window assembly is attached to the rear edge of the top of the rear canopy section that also contains a latch and lock to provide a secure cargo area.

This patent describes a two-part pick-up truck cargo canopy assembly that emphasizes the need for opening the rear of the shell-covered area at times. The problem is that it uses a unitarily manufactured rear section that would be quite heavy and not easily stored. This shell system could not be easily sold in an automotive parts store due to the large size and the inventory area required. This design also differs from the retractable roof system, truck shell variation in two distinct ways: It does not employ a track system, nor does it stow the opening portion of the shell on board, above the truck cab.

U.S. Pat. No. 4,974,898 of Irving Baranski tells of a telescoping cover for storage facilities, particularly vehicle cargo beds, which utilizes a plurality of cover sections in successive mutual telescopically receivable relation that slide on guideways in a self-cleaning manner. In the preferred embodiment, a plurality of movable cover sections are provided which are successively mutually telescopable into a stationary cover section through use of a pair of parallel guideways. Each cover has a top from which depend downwardly mutually opposing sides. The guideways, which are attached to the storage facility sidewalls, are made of an elongated base having a substantially flat surface from which extends a plurality of elongated bosses. The bosses have an upper portion, which is disposed in offset relation to a lower portion, which in turn mates with the elongated base. The movable cover sections have a slot in the lower terminus of each side receiving a boss. A detent is provided that protrudes into the slot, interfering with the offset upper portion of the boss and preventing vertical movement of the movable cover section. The surface shape of the slot and its associated detent in each side of the movable cover sections are mutually complementary with the surface shape of the boss received therein. Accordingly, as the movable cover sections are slid along the guideway, accumulated debris is automatically wiped off the boss by interaction of the complementary surfaces.

This patent describes a telescoping cover for storage facilities, particularly vehicle cargo beds, which utilizes a plurality of cover sections in successive mutual telescopically receivable relation that slide on guideways. Although this patent describes a telescoping device, it is limited to just telescoping over the bed area and does not extend over the cab of the vehicle, and does not entirely retract from the truck bed cargo area.

U.S. Pat. No. 5,127,701 of Kevin Miller discloses a shell for the bed of a pick-up truck. The shell is comprised of a base member mounted to the truck bed and a top member hinged to and fitted over the base member. The top member is hinged in such a manner that it may be swung open to allow access to the interior of the bed from the side as well as the rear of the truck. The hinge means have a quick release feature so that the top member may be removed for greater hauling capacity. A fabric covering may be substituted for the top member as an alternative cover.

This patent describes another two-part pick-up truck shell assembly that again emphasizes the need for opening the rear of the shell-covered area at times. The problem is still that it uses a unitarily manufactured rear section that would be quite heavy and not easily stored. It could not be opened and closed easily, and does not stow the opening portion of the shell, as does the retractable roof system, truck shell variation. This is another shell for pick-up trucks that could not be boxed in a compact manner, and sold in an automotive parts store, or discount retail outlet, due to its bulk.

U.S. Pat. No. 6,942,279 of Richard Hoover describes an improved camper shell that is collapsible and portable. The shell consists of a cover that is positioned over a shell frame. The shell frame is formed by a plurality of components, preferably formed of steel, that are fitted together for use and that may be stored within the cover when not in use. The mainframe components include bottom supports, vertical supports coupled thereto, and cross-members. Preferably, the bottom supports and cross-members are adjustable in length, to fit a plurality of truck bed sizes. The frame preferably angles downward from rear to front, for drainage and other purposes This patent describes a light duty collapsible shell for pick-up trucks that would be covered with a canvas material. This device would not support a lumber/sport rack and does not provide security or the unique means of the sliding roof panels that can be stored over the cab of the truck.

Thus, there has existed a long-felt need for a retractable roof system for both vehicle roofs, and truck shells, that provides for the security offered only by a hard-surfaced enclosure, as well as the unlimited vertical cargo volume offered by an uncovered truck bed. The roof portion of the cover should be easily moved and stowed above the vehicles roofline, and enable users to quickly and efficiently convert the enclosed truck bed to an open area capable of transporting tall or oversized cargo.

SUMMARY OF THE INVENTION

The primary advantage the retractable roof system, vehicle and truck shell variation, is that the design offers a hard enclosure, with slidably adjustable roof panels, capable of stacking and stowing above the cab of a truck, or above the roof of a vehicle, opposite the end in which the roof panels are retracted.

Another advantage of the retractable roof system, truck shell variation is that it provides a convenient means for transporting large, oversized items in a truck, by opening the roof, and rear window of the enclosure, as opposed to removing the entire shell from the bed of the truck.

Another advantage of the retractable roof system truck shell is that telescoping rails extend over the truck cab as a method to stow the roof panels. The telescoping rails retract, along with the roof panels, as the roof panels are returned atop the shell.

Another advantage of the retractable roof system truck shell is that it integrates a heavy-duty metal framework into the side window panels and front window panel, facilitating: 1) rigidity while the roof is open, and 2) modular attachment of a lumber/sport rack.

Another advantage of the retractable roof system, truck shell variation is that the telescoping rails eliminate the need for 1) displacing cargo space to stow conventional roof panels, and 2) leaving roof panels in the garage, as is the case with some conventional removable roof panels.

Another advantage of the retractable roof system, truck shell and vehicle variations is that, upon stowing the cargo area roof panels and rear window panel in the forward, stowed position, multiple padded load stabilizing bars may be inserted into the track assembly, to stabilize tall loads at the roofline elevation, at both the fore and aft ends of the tall load. The padded load stabilizing bars employ the same quick-connect retaining pins as do the roof panels, to engage the same series of retaining pin orifices within the channels, so that they may be positioned fore and aft in fine increments.

Another advantage of the retractable roof system truck shell is that it may be palletized, shipped and warehoused within a compact crate or box, and be distributed at an automotive supply, mega-mart, or club store due to its modular design.

Another advantage of the retractable roof system, truck shell variation is that a single individual can quickly and easily install any brand-specific model, of any size or style using common hand tools.

And still another advantage of the retractable roof system truck shell is to provide a truck shell kit with available lumber/sport rack accessories, which may be purchased and installed separately, using simple hand tools. Similarly, the accessories may be removed to facilitate a shell with a standard appearance. Current rack designs for use with shells use an exo-frame of tubing, and thin flat metal tabs to squeeze between the base of the shell, and the top of the bedrails, in a precarious attempt to distribute the payload to the bed rails. Lastly, a base shell (trackless embodiment of the retractable roof system) may be upgraded to an economy track shell (taller than cab, simplified track embodiment of the cab-level retractable roof system) model. Likewise, the base shell or economy track shell may be upgraded to a cab-level shell. Each upgrade is accomplished by simply substituting the-(left and right) track assemblies, as they all share identical exterior dimensions and mounting locations.

A further advantage of the retractable roof system truck shell is that each component of the retractable roof system truck shell is relatively lightweight and easy to install, slide, remove, and replace.

Yet another advantage of the retractable roof system, as applied to a vehicle roof, is that the roof panels may be translated in either the aft direction (to expose the seating area), or the fore direction (to open the cargo area), within the same track system.

Another advantage of the retractable roof system, as applied to a vehicle or shell roof, is that one or more (standard opaque) roof panels may be temporarily or permanently substituted with a windowed roof panel, of either glass or Plexiglas, with any degree of tint and/or UV protection, with or without an optional retractable shade for each windowed roof panel. The vehicle passenger may enjoy a panoramic overhead view while shielded from inclement weather. The retractable roof system, as applied to a truck shell, may also substitute opaque roof panel(s) for translucent roof panel(s), offering a panoramic view to those using the cargo bed as a camper, with any degree of tint and/or UV protection, with or without a retractable shade for each windowed roof panel.

In this respect, before explaining at least one embodiment of the retractable roof system in detail, it is to be understood that the design is not limited in its application to the details of construction or the arrangement of the components set forth in the following description or illustrated in the drawings. The retractable roof system is capable of other embodiments and of being practiced and carried out in various ways. All window panels may be substituted for (windowless) wall panels, for utilitarian purposes. All opaque roof panels may be replaced with translucent windowed roof panels. In addition, it is to be understood that the phraseology and terminology employed herein are for the purpose of description, and should not be regarded as limiting.

The retractable roof system, truck shell variation provides a convertible shell enclosure for each brand, size and style of truck, whereas the roof panels and rear window panel can be slidably moved above the cab roof by means of a telescoping track system. The shell structure is composed of metal frame members that are secured into existing stake bed openings along the top edge of all pick-up truck beds, or alternatively, C-clamped to bed rails lacking such openings. A (right and left) track assembly, consisting of a channel and telescoping rail, double as integral structural metal frame members, connecting front and rear frame legs (herein referred to as front and back supports). Side window panels and a forward window panel are mechanically attached to the metal frame assembly. In both the shell and vehicle variations, the rear end plate of the telescoping rail assembly is (hingeably) opened, then multiple roof panels are engaged within track assembly, after which the rear end plate is closed and locked. In both the shell and vehicle variations, the rear window panel is attached to the rear roof panel by means of a durable hinge, upon which the rear window panel will pivot up, over and then come to rest upon, and latch onto a receiver along the top surface of the rear roof panel, before the roof panels are stowed in the forward position. In both the shell and vehicle variations, an optional lumber/sport rack set will be available, to be mounted atop the channel portion of each track assembly.

Security of the roof panels, as applied to the retractable roof system vehicle and truck shell variations, is accomplished with retaining pins and a pair of rail locks. Retaining pins protrude from the left and right edges, at the stern of each roof panel, engaging the channel pin orifices (with spring pressure) while the roof panels enclose the vehicle or shell variations, and engage the pin orifices within the telescoping rail while in the extended, open position (for both the vehicle and shell variations). In both the vehicle and shell variations, the telescoping rail is secured in place (either the extended or retracted position) by the rail lock, mounted below either channel. The rail lock is an assembly consisting of a handle with a spring-loaded plunger that engages either the front or rear orifice along the bottom of the telescoping rail, and maintained by spring pressure, while in the locked position. The extended (forward) position stows the roof panels above the cab roof, in the case of the shell variation. In the vehicle variation, roof panels may be stowed in either the forward position atop seating area roof panels, or extended over and beyond cargo area roof panels. In the truck shell variation, the retracted (rear) position places the roof panels between the side window Panels, to enclose and secure the shell. The rail lock handle is pulled down against the spring to unlock the plunger from (either) orifice in the bottom of the telescoping rail, then turned inward ninety degrees to hold the plunger in the unlocked position by engaging the lock pin, keeping the spring fully depressed. Upon extending or retracting the telescoping rail, the process is reversed to secure the rail lock.

The sequence of events for operation of the cab-level retractable roof system truck shell, and vehicle (with tailgate) variation, with the optional lumber/sport rack set, will consist of the following sequential steps:

1. Step up onto the rear bumper, then unlock and remove the (rear) lumber/sport rack crossbar. (Note that neither of the forward lumber/sport rack crossbars need to be removed).

2. Unlock and rotate the rear window panel up, over and atop the rear roof panel to engage the latching mechanism atop the rear roof panel.
3. Stow the lumber/sport rack crossbar in the dedicated crossbar clip, located on inside of the frame assembly (or behind a panel in the vehicle variation).
4. Open and stand upon the tailgate.
5. Inwardly retract the left and right (rear roof panel) retaining pins, located along the stem of the rear roof panel, from each of the channel orifices.
6. Push rear roof panel forward enough so that the panel ramps up into the telescoping tail, and then slides atop the forward roof panel, contacting the forward end plates.
7. Release both (rear roof panel) retaining pins, and allow the spring to engage the retaining pins into the pin orifices within each of the telescoping rails.
8. Inwardly retract the left and right (forward roof panel) retaining pins, located along the stem of the forward roof panel, from each of the channel orifices.
9. Push the forward roof panel forward enough so that the panel ramps up into, and comes to rest within the telescoping rail, contacting the forward end plates.
10. Release both (front roof panel) retaining pins, and allow the spring to engage the retaining pins into the pin orifices within each of the telescoping rails.
11. Downwardly retract both rail locks from the front orifices in both telescoping rails.
12. Push the aft end of both roof panels, to extend both telescoping rails, along with roof panels, over the cab roof (atop seating area roof panels in the vehicle variation).
13. Re-engage each rail lock into the rear orifices within the telescoping rail, to secure each telescoping rail in the forward extended, stowed position.
14. Engage one padded load stabilizing bar, at the preferred location within the cargo area, to stabilize the front of a tall load (i.e. refrigerator) at the roofline.
15. Load the (refrigerator) against the front padded load stabilizing bar.
16. Engage a second padded load stabilizing bar against the rear of the refrigerator.
17. Thread a rope or strap through the (horizontal) perforations through each of the padded load stabilizing bars, at each corner of the refrigerator, and tie/ratchet the loop snugly.
18. Close the tailgate and go.

Tie-Down Openings are also handy to anchor loads at the roofline elevation, located in the either Channel sub-assembly.

Various different vehicles are used as examples throughout this application, including a light duty pick-up truck standard cab, quad cab and an off-road SUV. It is intended, however, that many additional types of vehicles can benefit from the current invention, including cars, vans, sport/station wagons, boats, commercial (medium and heavy duty) and military trucks, busses, as well as standard SUVs, other off-road vehicle types, and recreational vehicles. Additionally, the accessory rack may be of the lumber rack or sport rack design. The use of a specific type of vehicle in the specification, abstract, or drawings is not meant to limit the scope of this application to that type of vehicle.

The foregoing has outlined rather broadly the more pertinent and important features of the retractable roof system, in order that the detailed description of the application that follows may be better understood, so that the present contribution to the art may be more fully appreciated. Additional features of the design will be described hereinafter, which form the subject of the claims of this disclosure. It should be appreciated by those skilled in the art that the conception, and the disclosed specific embodiment may be readily utilized as a basis for modifying or designing other structures, and methods for carrying out the same purposes of the present design. It is important, therefore, that the claims be regarded as including such equivalent construction insofar as they do not depart from the spirit and scope of the present application.

BRIEF DESCRIPTION OF THE DRAWINGS

The accompanying drawings, which are incorporated in and form a part of this specification, illustrate embodiments of the retractable roof system, and together with the description, serve to explain the principles of this application. The base truck shell assembly is not illustrated, as it appears identical to the retractable roof system truck shell depicted in FIG. 1. The difference in the base truck shell: Instead of including a pair of track assemblies—a pair of hollow rectangular tubing sections are substituted, having only a series of holes punched through their interior walls, through which hardware will pass to secure the roof panels in place (at the location where rollers would fasten to the roof panels, in the economy track and cab-level track models). This rectangular tubing also has holes punched on the top side (and nuts spot welded inside the tubing just under the holes) to allow attachment of the optional lumber/sport rack sets. The base model, however, does not allow the user to translate the roof panels fore and aft. Furthermore, the base roof panels lack the quick-connect, spring-loaded retaining pin assemblies described above. The roof panels (along with hinged rear window panel) may be easily unfastened from the rectangular tubing with simple hand tools, however, and stowed (vertically) atop one fender well, against the interior side of one side window panel, and held snugly in place by a simple (horizontal bearing) ratcheting strap (attached to fore and aft positions of the frame assembly along the interior of the side window panel).

FIG. 18 depicts a perspective view of a four-door Jeep Wrangler Unlimited with a retractable roof system vehicle variation, cab-level track assembly, with the optional sport rack set attached to the channel portion of the cab-level track assembly. Both roof panels (over the seating area) ramp upwards and cast rearwards to stow above the cargo area roof, and extend beyond the rear of the cargo area, enough to clear the opening above the rear seats. This design may also be reversed, to translate in the forward direction, so that the roof panel(s) from the cargo area (along with the rear window panel) cast forward, and stow above the seating-roof panel area. Lastly, a combination of the two designs described above may be integrated, allowing roof panel(s) above the seating area to cast rearward and stow above the cargo area roof panel(s), or allowing roof panel(s) above the cargo area to cast forward and stow above the seating area roof panel(s), all translating within the same track assembly.

For a more comprehensive understanding of the nature and advantages of the retractable roof system, reference should be had to the following detailed description, taken in conjunction with the accompanying drawings, which are incorporated in and form a part of this specification, illustrating embodiments of the design, together with the description, serving to explain the principles of this application.

DETAILED DESCRIPTION OF THE PREFERRED EMBODIMENTS

Figure 1:
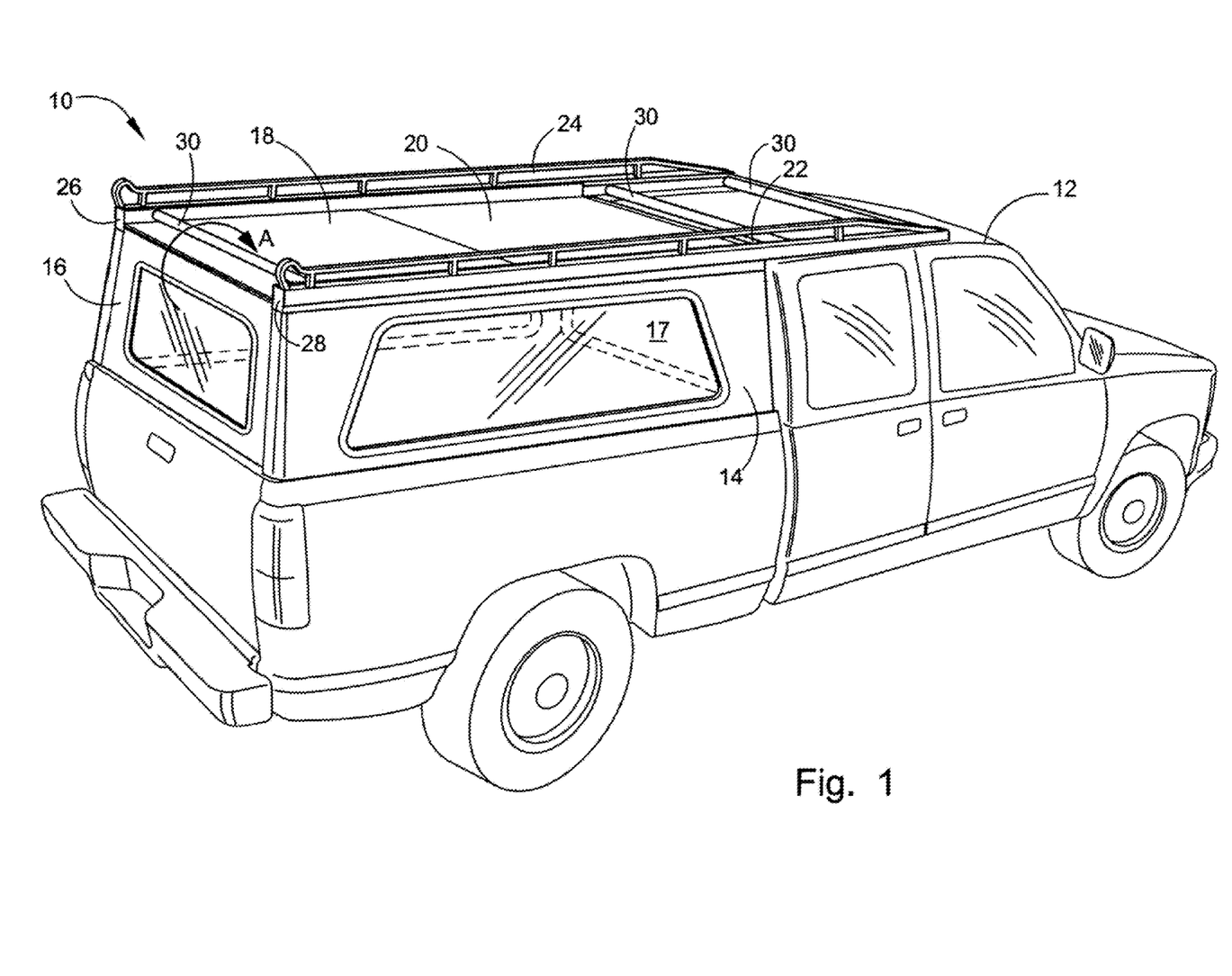
FIG. 1 depicts a perspective view of the cab-level retractable roof system truck shell variation, installed on a quad-cab pick-up truck with the optional lumber rack set attached.

Referring now to the drawings, wherein similar parts of the retractable roof system truck shell 10 are identified by like reference numerals, there is seen in FIG. 1 a perspective view of the retractable roof system truck shell 10 installed on a quad-cab pick-up truck 12. The right side window panel 14, the rear window panel 16, the front window panel 17, the rear roof panel 18 and the forward roof panel 20 form the exterior shell of the retractable roof system truck shell. The optional lumber rack set members 22 and 24 are shown attached to the left track assembly 26 and the right track assembly 28, joined by three lumber rack crossbars 30. These lumber rack crossbars may be replaced by using padded load stabilizing bars or sport rack bars (see FIG. 18) which are adjustable in the fore and aft directions to accommodate loads of varying length. Arrow A indicates capability of the rear window panel 16 to rotate up, over, and atop the rear roof panel 18, and trigger-latch securely to the receiver atop the rear roof panel 18.

Figure 2:
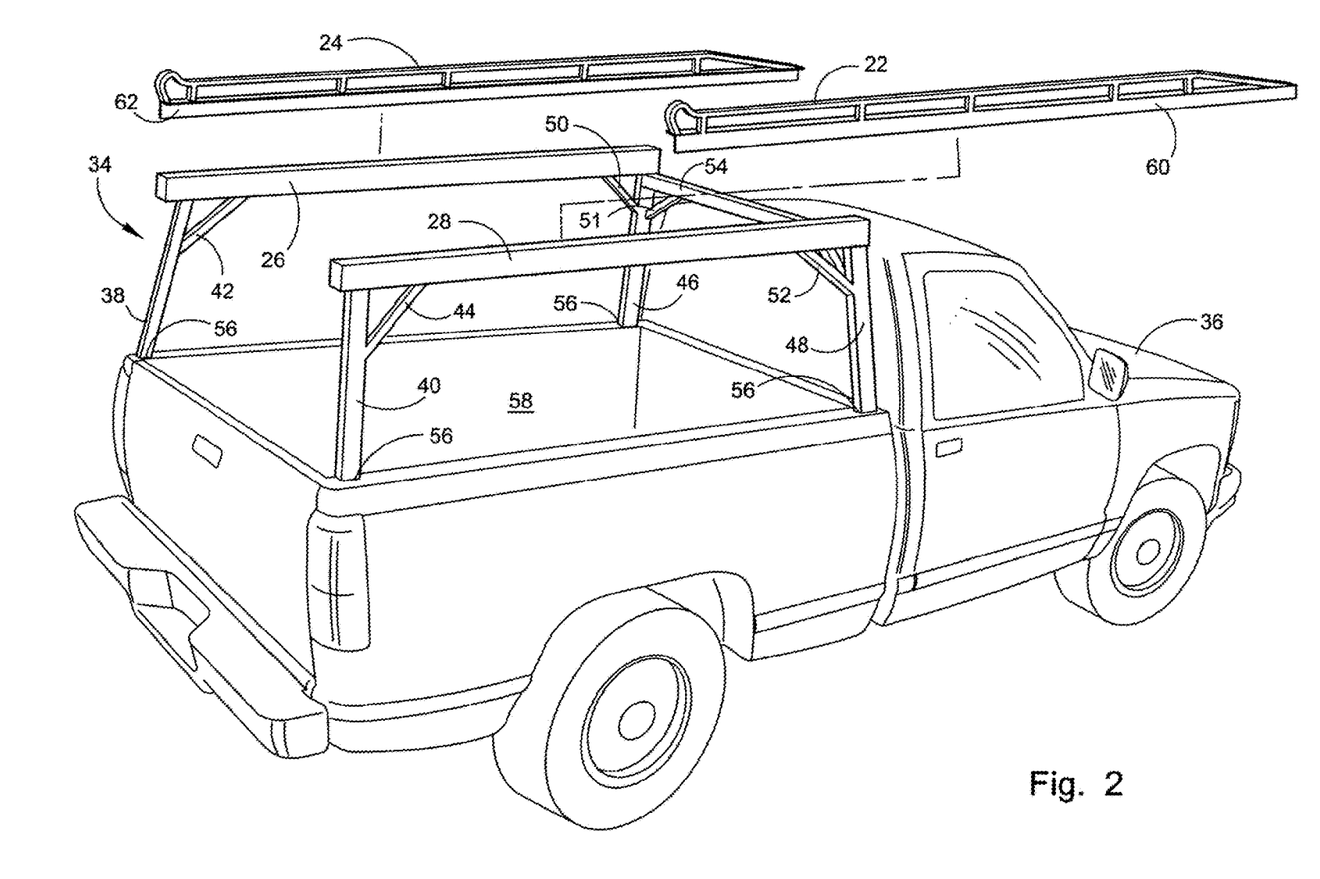
FIG. 2 depicts a perspective view of the economy track frame assembly of the truck shell variation, installed on a standard two door pick-up truck, with the lumber rack set exploded away. The optional sport rack set is not illustrated.

FIG. 2 depicts a perspective view of the frame assembly 34 of the economy track retractable roof system truck shell 10 installed on a standard two door pick-up truck 36 with the lumber rack set members 22 and 24 exploded away. Window panels and roof panels are removed to illustrate the Frame Assembly 34, consisting of two back supports 38 and 40, with gussets 42 and 44, and two front supports 46 and 48, with gussets 50, 51 and 52. A cross brace 54 spans the two front supports 46 and 48. The left track assembly 26 and the right track assembly 28 double as structural members, spanning back supports 38 and 40 (with gussets 42 and 44) and front supports 46 and 48 (with gussets 50 and 52). The back supports 38 and 40 and the front supports 46 and 48 will mount into the standard stake bed mounting holes 56 atop the pick-up truck bed rails, or alternatively, C-clamp to the bedrails. Optional lumber rack (members) 22 and 24 are mounted to the left track assembly 26 and the right track assembly 28, by the means of the angle sections 60 and 62. All frame assembly components, as well as track assemblies and roof panels will be readily assembled using standard conventional hand tools.

These hand tools would include screw drivers, hammers, wrenches, pliers, hand drills, hand saws, and clamps. In this regard, the various models of the retractable roof system truck shell would be made available as a do-it-yourself kit, enabling purchasers to buy all components in a single kit, as well as desired component accessories (such as lumber crossbars, padded stabilizer bars, sport racks, etc.), then assemble the truck shell using common hand tools.

Figure 3:
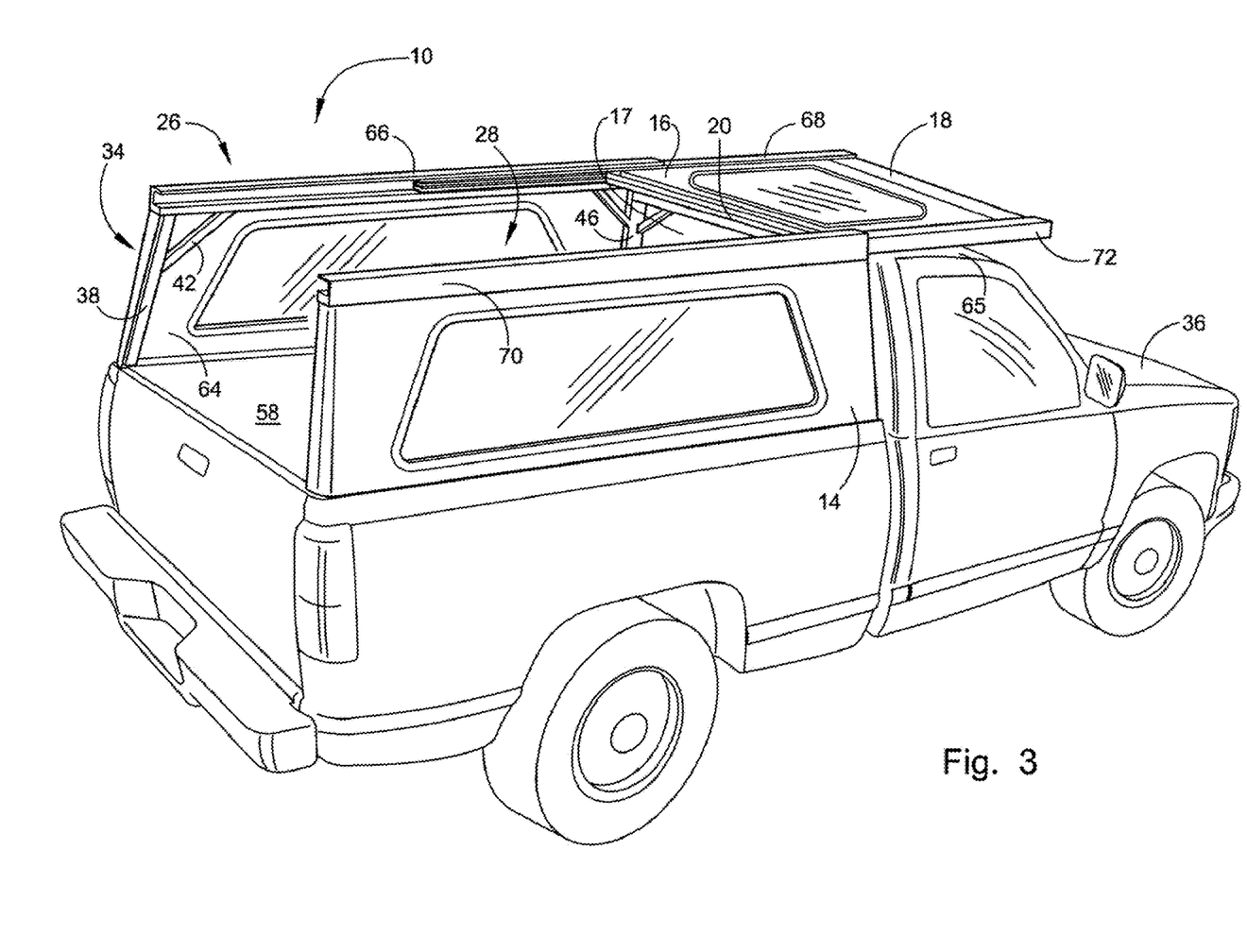
FIG. 3 depicts a perspective view of the economy track truck shell variation, installed on a standard two door pick-up truck, with roof panels stowed above the cab roof, within the extended telescoping rails.

FIG. 3 depicts a perspective view of the economy track retractable roof system truck shell 10 supported by the frame assembly 34, with left and right economy track assemblies 26 and 28 installed on a standard two-door pick-up truck 36. Right side window panel 14 and the left side window panel 64 are illustrated, along with both (front and rear) roof panels and rear window panel 16 stowed above the truck cab roof 65 in the forward extended (telescoped) position. The left economy track assembly 26 is shown with the (left) channel 66 mounted to the back support 38 and the front support 46 with the (left) telescoping rail 68 extended. The right track assembly 28 is shown, composed of the (right) channel 70, and the (right) telescoping rail 72, in the forward extended position. The rear roof panel 18, the forward roof panel 20, and rear window panel 16 are supported between the left telescoping rail 68 and the right telescoping rail 72.

Figures 4, 5:
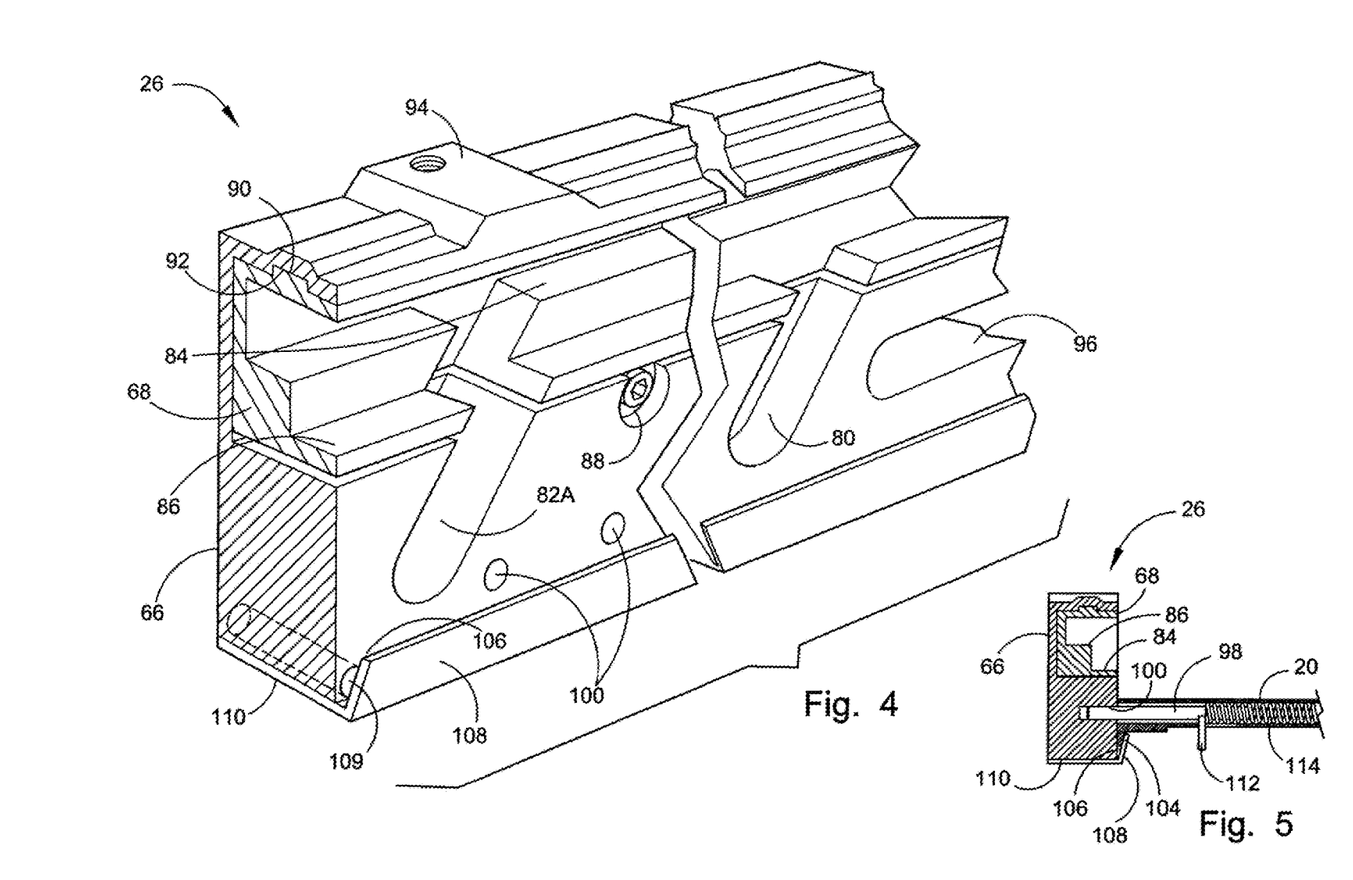
FIG. 4 depicts a perspective view of two segments of a cab-level (left) track assembly, illustrating one forward and one rear guide slot. The cab-level track assembly allows the roof panels to settle between the side window panels, at the same elevation as the cab roof (or seating area roof in the vehicle variation), unlike the economy track illustrated in FIGS. 2 and 3. The cab-level track assembly mounts to the same (front and back) supports of the frame assembly, at the same mounting locations as, and bears the same exterior dimensions as the economy track assembly, and base assembly (rectangular tubing), and therefore may be easily installed as a modular upgrade to a base or economy track shell.
FIG. 5 depicts a cross sectional view through a (left) cab-level track assembly, illustrating one of the retaining pins. The sport-rack crossbars (not shown) use the same retaining pin design as do the roof panels, to allow a plurality of positions by which equipment (of various lengths) may be secured.

In the following illustrations the left track assembly 26 has been depicted, though it must be understood that the right track assembly 28 is symmetrical in configuration and will contain all of the same elements. FIG. 4 depicts a perspective view of two segments of the cab-level (left) track assembly 26, illustrating a forward guide slots 80 and a rear guide slot 82A. The forward guide slot 80 extends upwards at an angle from the (Left) channel 66, terminating within the (left) telescoping rail 68. The (left) telescoping rail 68 translates within the (left) channel 66 by means of a plurality of rail bearings 88 in the (left) channel 66. The (left) telescoping rail 68 is held within the (left) channel 66 by means of the key section 90 atop the (left) telescoping rail 68, within the key slot 92 of the (left) channel 66. On the upper surface of the (left) channel 66 is a plurality of threaded bosses 94, provided as a means to attach the sport/lumber rack set. A plurality of tie-down openings 96 will extend through the (left) channel 66. A plurality of drain holes 109 will allow rain from the roof panels, collecting in the gutter plate cavity 106, to drain to the exterior side of the left side window panel 64.

Figure 14:
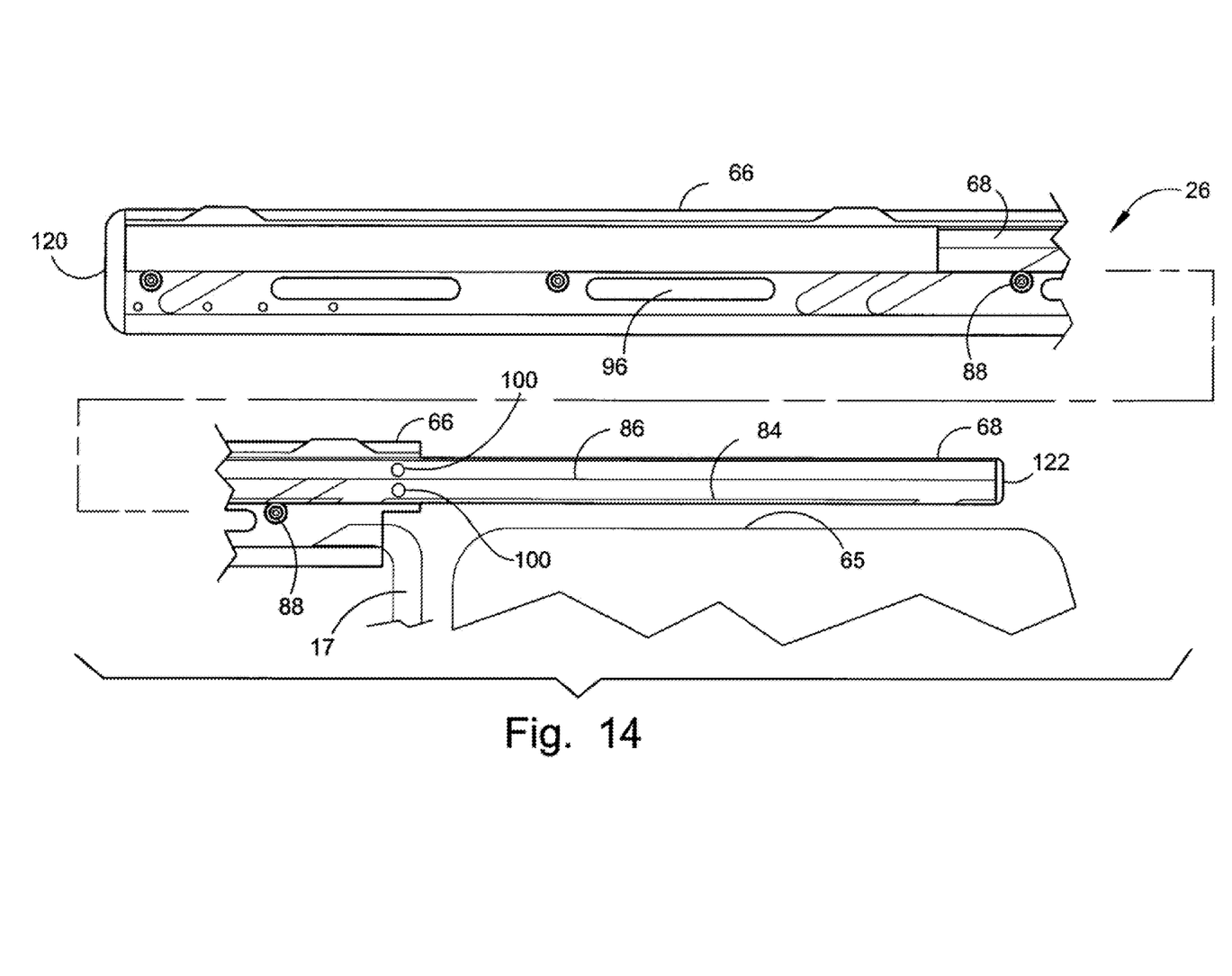
FIG. 14 depicts an inner side view of a (left) cab-level track assembly, with the telescoping rail extended over the truck cab.

FIG. 5 depicts a cross sectional view through the cab-level left track assembly 26 engaged by a (roof panel) retaining pin 98. Left and right retaining pins 98 are located at the stern of the forward roof panel 20 and the rear roof panel 18 (not shown). The retaining pins 98 engage pin orifices 100 near the lower edge of the (left and right) channels 66 and 68 [as well as pin orifices 100 in the walls of the (left and right) telescoping rails 68 and 72 as depicted in FIG. 14]. An angle segment 104 acts as a 'flashing' strip to facilitate drainage, and settles into a cavity 106 created by a gutter plate 108, mounted to the bottom surface 110 of the (left) channel 66. To disengage the retaining pins 98, the lever 112 is pulled inwards against spring 114, retracting the retaining pins 98 from the pin orifices 100. The roof panel (18 or 20) is then free to be cast forward, elevating the angle segment 104 out of cavity 106, by pushing forward on the stern of the roof panel (18 or 20).

Figure 6:
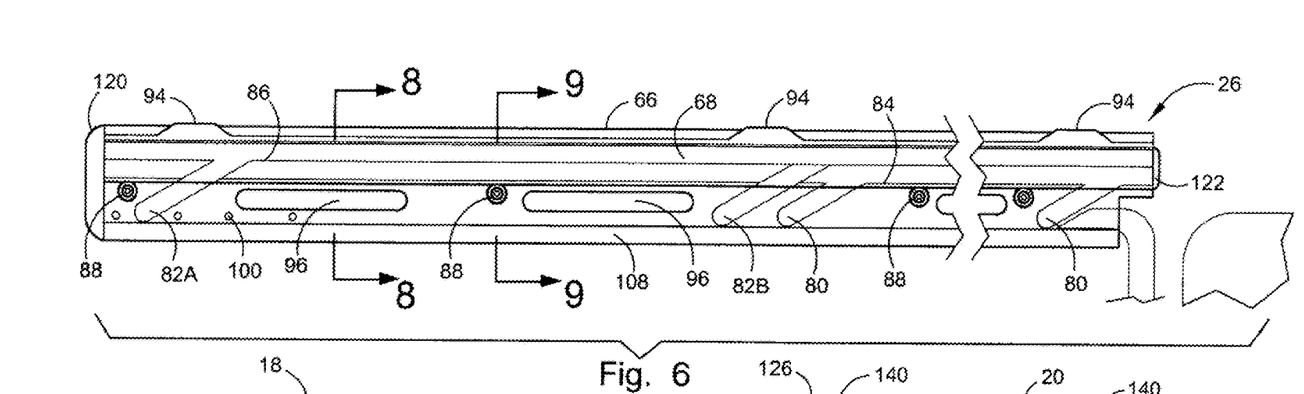
FIG. 6 depicts an interior side view of a cab-level left track assembly, illustrating both the left channel and left telescoping rail sub-assemblies, with the left telescoping rail in the retracted position.

FIG. 6 depicts an inner side view of a cab-level left track assembly 26, composed of a left channel and left telescoping rail. Within the left telescoping rail 68 are the two tracks. The upper track 86, upon which the (front and rear) rollers (136 and 138 respectively) of the rear roof panel cast along, and a lower track 84, upon which all four forward roof panel rollers 140 cast along, are clearly depicted in FIGS. 4, 5, 6, 8, 9 and 10. FIG. 6 further illustrates the locations of the two (rear roof panel) guide slots 82A and 82B, angled upwards to intersect with the upper track 86, within the left telescoping rail 68. The locations of the two (forward roof panel 20) guide slots 80 are also shown, intersecting the lower track 84 within the left telescoping rail 68. The angle of the guide slots 80, 82A and 82B may vary, depending upon the size and weight of the rear roof panel 18 and the forward roof panel 20, allowing them to easily translate between the cargo bed 58 position, to the stowed position above the truck cab roof 65. The slope of each (forward and rear) roof panel edge 126 and 128 corresponds with the slope of each guide slot 80, 82A, and 82B. The plurality of rail bearings 88 provide for smooth casting of the (left) telescoping rail 68, clearly depicted in FIG. 9. The tie-down openings 96 provide anchoring points to secure tall loads, at the roofline elevation, within the cargo bed 58. Rear end plate 120 will be (hingeably and lockably) mounted at the rear of the left and right channels 66 and 70, to retain the left and right telescoping rails 68 and 72. The forward end plates 122 are welded to the forward end of the left and right telescoping rails 68 and 72, to provide a stop for both the rear and forward roof panels 18 and 20, as well as to align the (roof panel) retaining pins with the pin orifices 100, within the left and right telescoping rails 68 and 72.

Figure 7:
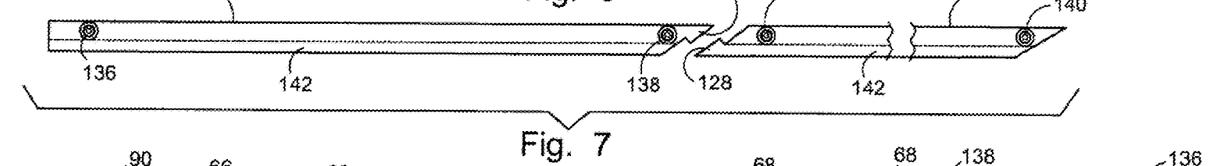
FIG. 7 depicts a side view of both the forward and rear roof panels. The angle of the front and rear roof panel edges corresponds with the angle of the guide slots within the track assembly. It must be understood that although the drawings depict two roof panels, the design may incorporate additional roof panels and remain within the scope of the patent.

FIG. 7 depicts a side view of both the forward roof panel 20 and rear roof panel 18, illustrating the configuration of the forward edge 126 of the rear roof panel 18 and the rear edge 128 of the forward roof panel 20, which forms a trough for (lateral) drainage of water. The slope of the roof panel's edges 126 and 128 will match the slope of the forward and rear guide slots 80, 82A and 82B. The rear roof panel 18 will have rear rollers 136 (with a wide track to engage the outer portion of upper track 86) and a front rollers 138 (with a narrow track to engage the inner portion of the upper track 86). Four forward roof panel rollers 140 (all of which are identical in width) will engage the lower track 84. The (left—not shown) and right edges of each roof panel bears an angled segment 104 (which acts as a 'flashing' strip for drainage) that settles into cavity 106, created by a gutter plate 108.

Figure 8:
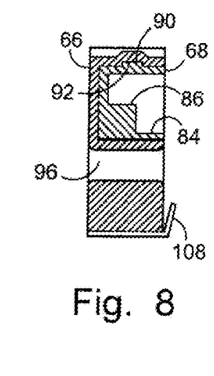
FIG. 8 depicts a cross sectional view through a (left) cab-level track assembly, at one of the tie down openings.
Figure 9:
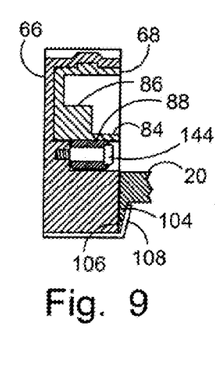
FIG. 9 depicts a cross sectional view through a (left) cab-level track assembly, at the location of a rail bearing.

FIG. 8 depicts a cross sectional view through the left cab-level track assembly 26 at one of the tie-down openings 96. FIG. 9 depicts a cross sectional view through the left cab-level track assembly 26, at the location of one of the rail bearings 88, illustrating the in-set-depth of the rail bearings 88, allowing for clearance of roof panels 18 and 20 to move up and down through the (guide slots 80, 82A and 82B—not shown). Rail bearings 88 are designed to be made of brass or urethane and use a shoulder bolt 144 as an axle, but a variety of other bearing types and materials may be used for this function, including cam followers, remaining within the scope of this application.

Figure 10:
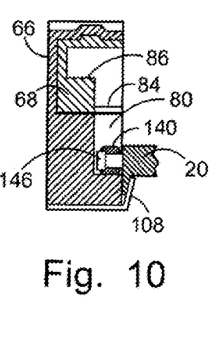
FIG. 10 depicts a cross sectional view through a (left) cab-level track assembly, with the forward roof panel in place, with one of the roof panel rollers resting at the bottom of a guide slot.
Figure 11:
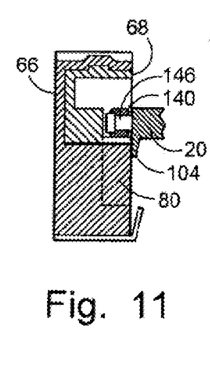
FIG. 11 depicts a cross sectional view through a (left) cab-level track assembly, with the forward roof panel roller elevated into the lower track of the telescoping rail.

FIG. 10 depicts a cross sectional view through the left track cab-level assembly 26 with the forward roof panel 20 in place, having one of the (forward roof panel) rollers 140 at the bottom of guide slot 80. The (forward roof panel) roller 140 is also designed to be made of brass or urethane and use a shoulder bolt 146 as an axle, but a variety of other bearing types and materials may be used for this function, including cam followers, remaining within the scope of this application. FIG. 11 depicts a cross sectional view through the left cab-level track assembly 26 with the forward roof panel 20 in the stowed position within the lower track 84 of the left telescoping rail 68.

Figure 12:
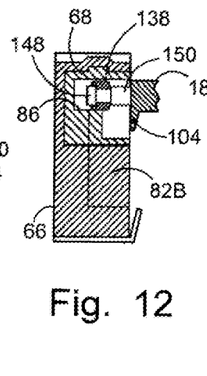
FIG. 12 depicts a cross sectional view through a (left) cab-level track assembly, with the (forward) roof panel roller of the (rear) roof panel elevated into the upper (inside) track of the telescoping rail.
Figure 13:
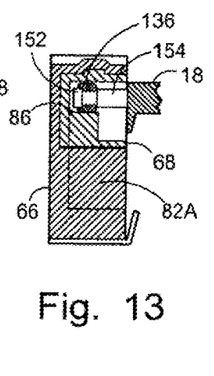
FIG. 13 depicts a cross sectional view through a (left) cab-level track assembly, with the (rear) roof panel roller of the (rear) roof panel elevated into the upper (outside) track of the telescoping rail. The additional width of the wide (rear roof panel) rear roller prevents it from descending into the narrow (rear roof panel) forward guide slot, as it casts to the forward position.

FIG. 12 depicts a cross sectional view through the left cab-level track assembly 26 with the front roller 138 of the rear roof panel 18 on the (inner portion of the) upper track 86. Shoulder bolt 148 is used as an axle with a short spacer 150 for the front roller 138. The width of the narrow front guide slot 82B, shown in hidden lines, is half as great as the width of the wide rear guide slot 82A. FIG. 13 depicts a cross sectional view through the left cab-level track assembly 26, with the rear roller 136 of rear roof panel 18 on the (outer portion of) upper track 86. Shoulder bolt 152 is used as an axle with a long spacer 154 for the rear roller 136 of the rear roof panel. The width of the wide rear guide slot 82A, shown with the hidden lines, is twice as great as the narrow front guide slot 82B. The wider rear guide slot 82A allows the wider rear roller 136, of rear roof panel 18, to ramp up the wider rear guide slot 82A, and cast along the (outer portion of) the upper track 86, then pass over the narrow front guide slot 82B, without falling into narrow front guide slot 82B, and ultimately stow above forward roof panel 20, above the truck cab roof 65.

Figures 15, 16, 17:
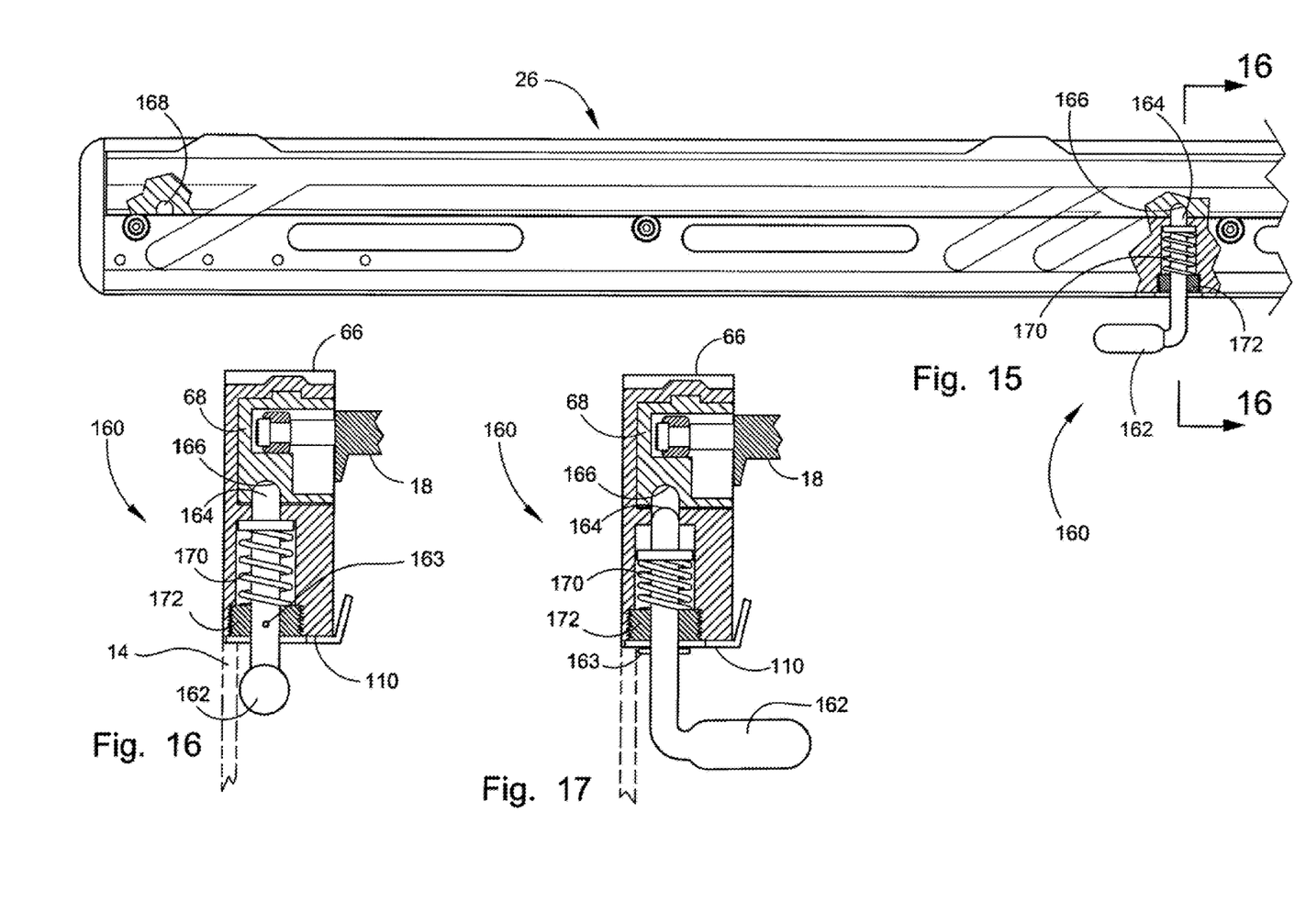
FIG. 15 depicts an inner side view of a portion of a (left) cab-level track assembly, with the rail lock in the secured position.
FIG. 16 depicts a cross sectional view through a (left) cab-level track assembly, with the rail lock in the secured position.
FIG. 17 depicts a cross sectional view through a (left) cab-level track assembly, with the rail lock in the unsecured position.

FIG. 14 depicts an inner side view of the left cab-level track assembly 26 with the left telescoping rail 68 extended over the truck cab roof 65. FIG. 15 depicts an inner side view of a portion of the left cab-level track assembly 26, illustrating rail lock 160 in the secured position. The rail lock 160 consists of a handle 162 with a spring-loaded plunger 164 and lock pin 163. The rail lock 160 engages the forward orifice 166 and rear orifice 168 within the left cab-level telescoping rail 68. Spring 170 is held in place by retainer 172. The rail lock 160 retains the left cab-level telescoping rail 68 in either the forward stowed position, or over the cargo bed 58, between the side window panels 14 and 64. When the handle 162 is pulled down to release the plunger 164 from the forward orifice 166 in the bottom of the left cab-level telescoping rail 68, the handle 162 is turned inward ninety degrees to lock the plunger 164 down with lock pin 163, keeping spring 170 compressed. The user then pushes on the stern of both roof panels 18 and 20, causing them to push the left cab-level telescoping rail 68, and right cab-level telescoping rail 72 (not shown) forward over the pick-up truck cab 65. The user then un-twists handle 162, allowing spring 170 to de-compress and engage the plunger 164 into the rear orifice 168. FIG. 16 depicts a cross sectional view through the left cab-level track assembly 26, illustrating rail lock 160 in the secured position. FIG. 17 depicts a cross sectional view through the left cab-level track assembly 26, illustrating rail lock 160 in the unsecured position.

Figures 18, 19:
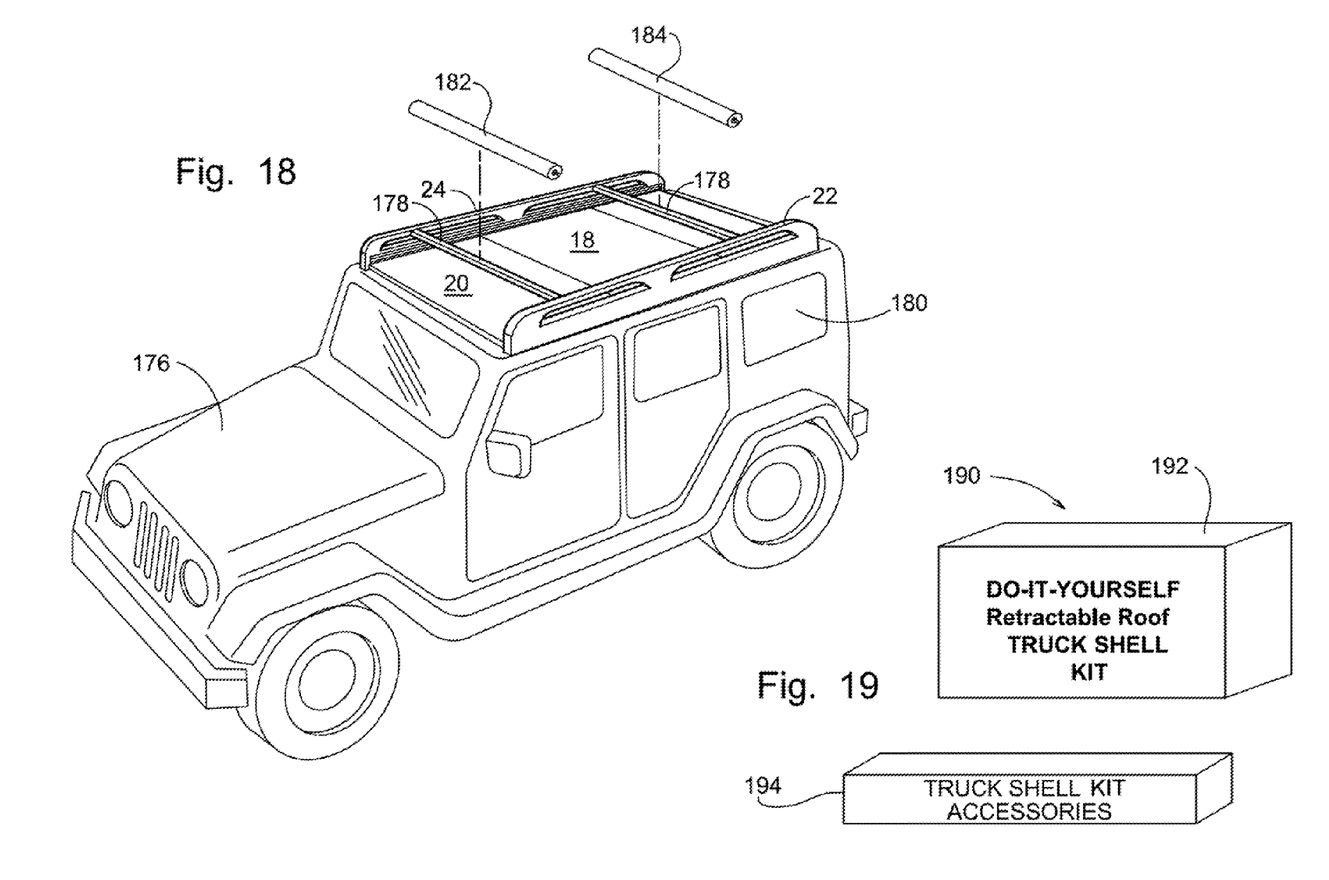
FIG. 19 depicts a do-it-yourself kit 190 of assemble-able retractable roof truck shell components which will allow a purchaser to construct the retractable roof truck shell using common hand tools. This kit may be marketed and sold in a single large box 192, with related accessories (like the padded stabilizer bars, or sport bars) sold in separate individual boxes 194, in "big box" department stores, auto parts specialty stores, etc. and on-line through retail websites.

FIG. 18 depicts a perspective view of a Jeep Wrangler Unlimited 176 vehicle with sport rack members 22 and 24, incorporating two sport rack bars 178. In this variation of the cab-level retractable roof system for vehicles, the forward roof panel 20 and middle roof panel 74, resting above the seating areas, are capable of ramping up and sliding back above, and extending beyond cargo roof panel 32 (and cargo area 180). Additionally, the cargo roof panel 32 (along with hingeably attached rear window panel - not shown) is capable of ramping up and sliding forward above forward roof panel 20 - note that the addition of a (third) sliding roof panel (cargo roof panel 32) necessitates a third (middle) track within the telescoping rails (not shown). As is the case with the retractable roof system truck shell, the sport rack 22 and 24 members are attached atop the left and right track assemblies 26 and 28, with both sport rack bars 178 spanning the sport rack members 22 and 24. Sport rack bars 178 do not interfere with the translation of roof panels 32, 74 or 20. Sport rack bars 178 are adjustable in the fore and aft directions, to accommodate loads of various lengths, including luggage, skis, snowboards, camping equipment, bicycles, surfboards, kayaks, etc. above the track assembly area. Optionally, pads 182 and 184 may be attached to sport rack bars 178 to cushion an object or load placed on the sport rack bars 178.

The retractable roof system shown in the drawings and described in detail herein discloses arrangements of elements of particular construction, and configuration for illustrating preferred embodiments of structure, and method of operation of the present application. It is to be understood, however, that elements of different construction and configuration and other arrangements thereof, other than those illustrated and described may be employed for providing a retractable roof system in accordance with the spirit of this disclosure. Such changes, alternations and modifications, as would occur to those skilled in the art, are considered to be within the scope of this design, as broadly defined in the appended claims.

Further, the purpose of the foregoing abstract is to enable the U.S. Patent and Trademark Office, the general public, and especially the scientists, engineers and practitioners in the art, who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A retractable roof system for vehicles having a cargo area and a passenger area comprising:
   (a) a frame assembly having two side portions, a front portion with front supports and a rear portion with back supports, a top portion and wherein said back supports and said front supports having a bottom portion whereby said frame assembly is affixed to the cargo area of a vehicle by attachment of said bottom portion;
   (b) two side panels attached to said side portions of said frame assembly, a front panel attached to said front portion of said frame assembly;
   (c) two roof panels including a forward-most and a rear-most roof panel located in the top portion of said frame assembly and a rear panel hingeably attached to the rear-most of said roof panels;
   (d) track assemblies located on the top portion of said frame assembly and running the length of the side portions of said frame assembly, having one or more track channels within said track assemblies, whereby said two roof panels are moveably affixed to said track assemblies within said track channels;
   (e) extendable track frame assemblies located in the front portion of said frame assembly having telescoping rails forwardly extendable over a vehicle passenger area; and
   (f) a rear end plate removably mounted at the rear of each of said track assemblies;
   whereby said roof panels translate forward and rearward within said track assemblies and are either removed from the vehicle by removing said rear end plate from each of said track assemblies, or are stored between, and affixed to, said telescoping rails within the extendable track frame assembly.

2. The retractable roof system for vehicles having a cargo area and a passenger area according to claim 1, wherein said frame assembly, said two side panels attached to said side portions of said frame assembly, said front panel attached to said front portion of said frame assembly, said two roof panels, said rear panel which is hingeably attached to said rear most roof panel, said track assembly and said telescoping rails are all independent units and are assembled and disassembled using conventional hand tools including screw drivers, hammers, wrenches, pliers, hand drills, hand saws, and clamps.

3. The retractable roof system for vehicles having a cargo area and a passenger area according to claim 2, wherein said frame assembly, said two side panels attached to said side portions of said frame assembly, said front panel attached to said front portion of said frame assembly, said two roof panels, said rear panel which is hingeably attached to said rear most roof panel, said track assembly and said telescoping rails are all independent units and are assembled and disassembled using conventional hand tools including screw drivers, hammers, wrenches, pliers, hand drills, hand saws, and clamps, and further wherein the retractable roof system is sold as a do-it-yourself kit to be assembled by the user.

4. The retractable roof system for vehicles having a cargo area and a passenger area according to claim 1, wherein said two side panels attached to said side portions of said frame assembly, said front panel attached to said front portion of said frame assembly, said two roof panels and said rear panel which is hingeably attached to said rear most roof panel, are opaque.

5. The retractable roof system for vehicles having a cargo area and a passenger area according to claim 1, wherein said two side panels attached to said side portions of said frame assembly, said front panel attached to said front portion of said frame assembly, and said rear panel which is hingeably attached to said rear most roof panel, include windows.

6. The retractable roof system for vehicles having a cargo area and a passenger area according to claim 1, wherein said rear panel which is hingeably attached to said rear most roof panel rotates into position atop the rear most roof panel and together the rear panel and rear-most roof panel translate over the front most roof panel before being translated into the storage position within said telescoping rails within the extendable track frame assembly.

7. The retractable roof system for vehicles having a cargo area and a passenger area according to claim 1, further wherein lumber rack set members are attached to the top portion of said frame assembly and running the length of the side portions of said frame assembly.

8. The retractable roof system for vehicles having a cargo area and a passenger area according to claim 7, further wherein said lumber rack set members include two crossbars wherein said crossbars are attached to said lumber rack set members which are attached to the top portion of said frame assembly and running the length of the side portions of said frame assembly.

9. The retractable roof system for vehicles having a cargo area and a passenger area according to claim 7, further comprising a sport rack wherein said sport rack comprises two sport rack members including two sport rack bars adjustable in the fore and aft directions to accommodate loads above the track assembly area.

10. The retractable roof system for vehicles having a cargo area and a passenger area according to claim 1, wherein said retractable roof system is used to enclose the cargo area of a conventional pick-up truck and is sold as a kit to be assembled by the user.

11. A method for making a retractable roof system for vehicles, comprising the steps of:
(a) providing a frame assembly having two side portions, a front portion with front supports and a rear portion with back supports, a top portion and said back supports and said front supports having a bottom portion whereby said frame assembly is affixed to the cargo area of a vehicle by attachment of said bottom portion;
(b) providing two side panels attached to said side portions of said frame assembly, a front panel attached to said front portion of said frame assembly;
(c) providing two roof panels including a forward-most and a rear-most roof panel located in the top portion of said frame assembly and a rear panel hingeably attached to the rear-most of said roof panels;
(d) providing track assemblies located on the top portion of said frame assembly and running the length of the side portions of said frame assembly, having one or more track channels within said track assemblies, whereby said two roof panels are moveably affixed to said track assemblies within said track channels;
(e) providing extendable track frame assemblies located in the front portion of said frame assembly having telescoping rails forwardly extendable over a vehicle passenger area; and
(f) providing a rear end plate removably mounted at the rear of each of said track assemblies;
whereby said roof panels translate forward and rearward within said track assemblies and are either removed from the vehicle by removing said rear end plate from each of said track assemblies, or are stored between, and affixed to, said telescoping rails within the extendable track frame assembly.

12. The method for making a retractable roof system for vehicles, according to claim 11, further including the step of providing a frame assembly said front panel attached to said front portion of said frame assembly, and said two roof panels and said rear panel hingeably attached to the rear-most of said roof panels, said track assembly and said track assembly, that are all independent units which are assembled and disassembled using conventional hand tools including screw drivers, hammers, wrenches, pliers, hand drills, hand saws, and clamps.

13. The method for making a retractable roof system for vehicles, according to claim 12, wherein the retractable roof system for vehicles is sold as a do-it-yourself kit to be assembled by the user.

14. The method for making a retractable roof system for vehicles, according to claim 11, further including the step of providing said roof panels that are opaque.

15. The method for making a retractable roof system for vehicles, according to claim 11, further including the step of providing a front panel attached to said front portion of said frame assembly, a rear panel hingeably attached to the rear-most of said roof panels that include windows.

16. The method for making a retractable roof system for vehicles, according to claim 11, wherein said rear panel rotates into position atop the rear-most roof panel and together the rear panel and rear-most roof panel translate over the front-most roof panel before being translated into the storage position within said telescoping rails within the extendable track frame assembly.

17. The method for making a retractable roof system for vehicles, according to claim 11, wherein said step of providing track assemblies further includes the step of providing track assemblies having lumber rack set members which are attached to the top portion of said frame assembly and running the length of the side portions of said frame assembly.

18. The method for making a retractable roof system for vehicles, according to claim 17, wherein said step of providing track assemblies having lumber rack set members further includes lumber rack set members comprising two crossbars wherein said crossbars are attached to said lumber rack set members.

19. The method for making a retractable roof system for vehicles, according to claim 17, further comprising the step of providing a sport rack wherein said sport rack members comprise two sport rack bars adjustable in the fore and aft directions to accommodate loads above the track assembly area.

20. The method for making a retractable roof system for vehicles, according to claim 11, further comprising the step of using said retractable roof system to enclose the cargo area of a conventional pick-up truck, and the step of selling said retractable roof system as a kit to be assembled by the user.

* * * * *